Patented Feb. 28, 1933

1,899,094

UNITED STATES PATENT OFFICE

ALBERT JAN KLUYVER AND MARINUS ADRIANUS SCHEFFER, OF DELFT, NETHERLANDS, ASSIGNORS TO THOMAS HERMANUS VERHAVE, SENIOR, OF DELFT, NETHERLANDS

PROCESS FOR THE PREPARATION OF ACETYL-METHYL-CARBINOL AND DIACETYL

No Drawing. Application filed May 21, 1929, Serial No. 364,935, and in the Netherlands July 10, 1928.

Although it has long been established as a purely scientific fact that acetyl-methyl-carbinol is formed in various microbiological transformations of very different substances, such as carbohydrates, organic acids, aldehydes, oxy-acids, alcohols, ketonic-acids and the like, the quantity produced is too small to base thereon a technical method of making this carbinol.

Even in cases where, in accordance with an invention of the present applicants disclosed in their copending application Ser. No. 364,934, filed herewith, very large quantities of the closely related 2.3-butylene-glycol are formed in such bacterial conversions (as in the fermentation of sugar by bacteria such as aerobacter aerogenes, clostridium polymyxa and many others, in which this glycol is formed in quantities of more than 30% of the fermented sugar, when operating in accordance with the process of said copending application), the quantity of acetyl-methyl-carbinol produced seldom amounts to more than 1% of the sugar fermented.

With such a small yield there can be no question of a technical application in this way of making the carbinol.

It is presumed that the 2.3-butylene-glycol, occurring with the last-mentioned fermentations, owes its existence to a reduction of acetyl-methyl-carbinol formed primarily in the fermentation, but no one has succeeded until now in protecting the last-mentioned product against a conversion during the fermentation process.

Walpole (Proceedings of the Royal Society of London, vol. 83 (1911), Series B, pages 272–286) tried to produce considerable quantities of the carbinol by passing oxygen in a solution of 2.3-butylene-glycol inoculated with aerobacter aerogenes. After 22 days' passage of pure oxygen into the mash only 7% of the glycol had been converted into carbinol.

According to the present invention the carbinol is made from an aqueous mixture or mash containing a fermentable carbohydrate such as sugar, with yields of 35% and more by blowing large quantities of air through the mash during a fermentation which under normal conditions (i. e. aeration less intense than that hereinafter defined as characterizing the present invention) would produce 2.3-butylene-glycol with relatively little carbinol, if any. This result is the more surprising in view of the fact that quantities of air which might be called large, such as 2.4 m³ of air per hour per hectolitre of mash remain without any appreciable effect on the nature of the fermentation products. But when this quantity of air is considerably increased, say up to even as high as 25 m³ per hour per hectolitre, considerable yields of carbinol are obtained. In this way 35% and more of the weight of sugar present in the mash can be converted into acetyl-methyl-carbinol.

It has been found unnecessary to aerate concurrently with fermentation to such an extent that the formation of butylene-glycol during fermentation is altogether prevented since any glycol formed by lack of sufficient aeration can be converted after the main fermentation period into acetyl-methyl-carbinol by continuing the strong aeration of the liquid. But intensive aeration either during or after the fermentation is essential. For the purposes of this invention, intensive aeration is to be understood as meaning aeration at a rate substantially in excess of 2.4 m³ (cubic meters) of air per hour per hectolitre of mash. On the other hand, reference to normal conditions of aeration is to be understood as meaning aeration at not to exceed 2.4 m³ of air per hour per hectolitre of mash.

Since relatively considerable amounts of the volatile acetyl-methyl-carbinol are carried by the escaping air, it is necessary, in order to obtain high yields, to recover such carbinol by washing the escaping air and fermentation gases in one or more suitable washing devices.

The mentioned quantities of air are only given by way of example as it has been found possible to economize considerably on the quantities of air by augmenting the contact between the air and the fermenting mash by making use of special air diffusing devices in the fermentation vessel.

By the application of this process acetyl-methyl-carbinol can be obtained on a technical scale; the acetyl-methyl-carbinol is withdrawn from the fermented mash and the absorbing liquid from the washing apparatus either by distillation and rectification, or by extraction by means of suitable solvents.

Furthermore according to the invention, the fermented mash may be subjected to the action of oxidizing agents both biological and chemical, for example, by distilling the mash in the presence of ferric chloride and dilute sulphuric acid. In either case, the acetyl-methyl-carbinol is thereby quantitatively transformed into diacetyl which can be separated in pure condition by distillation and rectification.

An important feature of the invention in its most desirable embodiments consists in the use of fermentable carbohydrate materials that are cheap and readily obtainable, in contrast to methods heretofore known which employed a very dilute solution of a pure sugar, for example, and required the addition of some costly disintegration product of protein, such as peptone, as a nutrient or assisting agent in the fermentation. Thus, it is of especial advantage in practicing the present process to employ as the basis of the fermentation mixture a starchy vegetable product such as potatoes, or a sugar-containing industrial residue such as molasses. For convenience, materials of this class may be generically termed natural complex organic products. Such materials always contain naturally, in addition to a carbohydrate which is fermentable either as such or upon saccharification with malt or the like, associated organic nitrogenous compounds as well as other compounds available as nutrient or assisting agents in the fermentation process. Consequently, in using such starting materials in the manner herein disclosed, it is only necessary to supplement the nutrient substance which they and the saccharifying agent (e. g. if malt be employed) naturally contain by the addition of cheap nutrient or assisting material, such as a phosphate and a carbonate, for example. Addition of a costly agent like peptone is thus wholly avoided.

Example I 500 kilos of beet-molasses are heated by direct steam to boiling temperature in 5000 litres of water with addition of 20 kilos phosphorite and 23 kilos of ground calcium carbonate, and after cooling brought into a closed fermentation vat previously sterilized. After the mash has been cooled down to 40° C. there are introduced 500 litres of a mother culture of aerobacter aerogenes in malt-mash. After the starting of the fermentation has become apparent by evolution of gas, which is usually the case after 8-10 hours, a quantity of air amounting to 100 $m^3$ per hour is blown through. This speed is gradually increased, preferably in such manner that the speed per hour is increased every quarter of an hour by 100 $m^3$ until this speed has attained 1200 $m^3$ or about 20 $m^3$ per hour hectoliter of mash. This speed is maintained to the end of the fermentation after which the fermented mash is extracted by means of carbon tetrachloride in an extraction kettle; the carbon tetrachloride is then removed by distillation and rectification. In this way 72 kilos of acetyl methyl carbinol are obtained in practically pure condition.

Example II 4000 kilos of potatoes with a starch content of 17% are heated in an autoclave by indirect or by live steam in such a way that in 45 minutes a pressure of 50 pounds per square inch is obtained. After this the contents are mashed in the usual way in a mash-tun with 90 kilos of malt. After saccharification the mash is heated to about boiling temperature and subsequently cooled to 37° C. in a closed fermentation apparatus which has been previously sterilized. 30 kilos of superphosphate and 40 kilos of sieved limestone are added and the whole is inoculated with 300 litres of a mother culture of aerobacter aerogenes in a malt-rye mash. Thereafter aeration of the mash is started; a quantity of air of 60 $m^3$ per hour is blown through. The gases escaping from the closed fermentation vessel are led into a washing column with cold water retaining the acetyl-methyl-carbinol carried away from the fermentation vessel. After 15 hours of fermentation the quantity of air is increased to 110 $m^3$ per hour. The fermentation of the mash continues without altering the intensity of aeration till after about 36 hours the sugar has disappeared. The aeration of the liquid is continued for another 12 hours till the butylene-glycol produced besides acetyl-methyl-carbinol during the sugar fermentation is converted into acetyl-methyl-carbinol.

The fermented mash and the washing liquid are now pumped into a lead-lined iron distillation apparatus and 600 kilos of anhydrous ferric chloride are added. The distillation kettle is heated by indirect steam and the boiling vapours are rectified whereby 270 kilos diacetyl with a water content of 13% are obtained.

Example III 1000 kilos of finely ground maize with a starch content of 60% are placed in an autoclave with 4000 liters of water. Then 38 kilos of sieved limestone and 5 kilos of superphosphate are added. The autoclave is closed and the contents are heated with steam until a pressure of 5 atmospheres is reached. The mash is kept for 3 hours in this condition. The liquefied maize is then blown in a closed fermentation vessel in such manner that the evolved vapors can escape. This mash is cooled to a temperature of about 40° C. and immediately afterwards inoculated with a fresh culture of aerobacter aerogenes in a maize-malt mash of 500 liters. About 10 hours after the inoculation, fermentation becomes apparent. Thereupon aeration is begun by passing air through the mash at the rate of 40 m³ of air per hour. After 8 hours the aeration is increased to 140 m³ per hour, and after another 8 hours to 500 m³ per hour. This intensive aeration is maintained until the fermentation is finished which requires a total of about 55 hours, at the end of which time all fermentable carbohydrates have disappeared. During the whole process the gases evolved from the fermentation vessel are carried through washing-apparatus. The mash is worked up to diacetyl as described in Example II. A yield amounting to about 120 kilos of diacetyl is obtained.

What we claim is:

1. In the manufacture of valuable products by bacterial conversion of carbohydrate-containing material, the process which comprises preparing a fermentable carbohydrate mash, inoculating the mash with a culture of bacteria which under normal conditions of aeration produce 2.3-butylene-glycol, subjecting the fermenting mash to an intensive aeration to produce acetyl-methyl-carbinol.

2. In the manufacture of acetyl-methyl-carbinol, the process which comprises subjecting a fermentable carbohydrate mash to fermentation with bacteria which under normal conditions of aeration produce 2.3-butylene-glycol, subjecting the fermenting mash to an intensive aeration whereby a substantial proportion of acetyl-methyl-carbinol is formed, and recovering volatile fermentation products present in the escaping mixture of air and fermentation gases by washing the same.

3. In the manufacture of acetyl-methyl-carbinol, the process which comprises preparing a sterilized fermentable carbohydrate mash containing a nitrogen compound, a phosphate and a carbonate, inoculating the mash with a culture of bacteria which under normal conditions of aeration produce large quantities of 2.3-butylene-glycol from such a mash, waiting until fermentation has become apparent by evolution of gas, subjecting the fermenting mash to an intensive aeration, and separating resulting acetyl-methyl-carbinol.

4. The process according to claim 3, in which volatile fermentation products present in the escaping mixture of air and fermentation gases are recovered by washing with an absorbing liquid, and thereafter working up this liquid with the fermented mash.

5. In the manufacture of acetyl-methyl-carbinol, the process which comprises preparing a sterilized fermentable carbohydrate mash, containing a nitrogen compound, a phosphate and a carbonate, inoculating the mash with a culture of bacteria which under normal conditions of aeration produce 2.3-butylene-glycol from such a mash, subjecting the fermenting mash to an exceedingly powerful aeration which increases in rate during the fermentation, and separating resultant acetyl-methyl-carbinol.

6. The process according to claim 5, in which volatile fermentation products present in the escaping mixture of air and fermentation gases are recovered by washing with an absorbing liquid, and thereafter working up this liquid with the fermented mash.

7. In the manufacture of acetyl-methyl-carbinol, the process which comprises preparing a fermentable carbohydrate mash containing a nitrogen compound, a phosphate and a carbonate, inoculating the mash with a culture of bacteria which under normal conditions of aeration produce large quantities of 2.3-butylene-glycol from such a mash, waiting some hours until fermentation has become apparent by evolution of gas, subjecting said mash to aeration at a rate increasing eventually to about 20 cubic meters per hour per hectolitre of mash, maintaining this aeration until the fermentation is finished, and separating resultant acetyl-methyl-carbonol.

8. The process according to claim 7, in which volatile fermentation products present in the escaping mixture of air and fermentation gases are recovered by washing with an absorbing liquid, and thereafter working up this liquid with the fermented mash.

9. In the manufacture of diacetyl, the process which comprises inoculating a fermentable carbohydrate mash with a culture of bacteria which under normal conditions of aeration produce 2.3-butylene-glycol, subjecting the fermenting mash to intensive aeration, subjecting the fermented mash to an oxidizing treatment to convert acetyl-methyl-carbinol contained therein to diacetyl, and separating the resultant diacetyl.

10. In the manufacture of diacetyl, the process which comprises inoculating a fermentable carbohydrate mash with a culture of bacteria which under normal conditions of aeration produce 2.3-butylene-glycol, subjecting the fermenting mash to intensive aeration, washing the escaping mixture of air and fermentation gases with an absorbing liquid, converting the acetyl-methyl-carbinol contained in the fermented mash liquid and in the washing liquid into diacetyl by an oxidizing treatment of said liquids, and separating resultant diacetyl.

11. In the manufacture of diacetyl, the process which comprises inoculating a sterilized fermentable carbohydrate mash containing a nitrogen compound, a phosphate and a carbonate with a culture of bacteria which under normal conditions of aeration produce 2.3-butylene-glycol from such a mash, waiting some hours until fermentation has become apparent, subjecting said mash to aeration at a rate increasing eventually to about 20 cubic meters per hour per hectolitre of mash, maintaining this aeration until the fermentation is finished, washing the escaping mixture of air and fermentation gases with an absorbing liquid, converting the acetyl-methyl-carbinol contained in the fermented mash liquid and in the washing liquid into diacetyl by an oxidizing treatment of said liquids, and separating resultant diacetyl.

12. In the manufacture of acetyl-methyl-carbinol, the process which comprises inoculating a fermentable carbo-hydrate mash with a culture of bacteria which under normal conditions of aeration produce 2.3-butylene-glycol, subjecting the fermenting mash to aeration sufficiently strong to accelerate the fermentation but insufficiently strong to prevent formation of butylene-glycol, and continuing the aeration after the main fermentation period is terminated until the butylene-glycol has substantially disappeared and the yield of acetyl-methyl-carbinol is increased.

13. In the manufacture of useful products by fermentation with the aid of bacteria capable of producing butylene-glycol under normal conditions of aeration, the process which comprises subjecting an aqueous fermentation mixture containing a fermentable carbohydrate associated with suitable nutrient material to the fermenting action of bacteria capable of producing butylene-glycol in such a mixture under normal conditions of aeration, and intensively aerating the mixture to ensure formation of a substantial proportion of acetyl-methyl-carbinol.

14. In the manufacture of useful products by fermentation with the aid of bacteria capable of producing butylene-glycol under normal conditions of aeration, the process which comprises preparing an aqueous fermentation mixture from a natural complex organic product, which product contains a fermentable carbohydrate in association with substances capable of serving as nutrient or assisting agents in fermentation, adding to the mixture supplemental nutrient material to assist fermentation, inoculating with a culture of bacteria capable of producing butylene-glycol in such a mixture under normal conditions of aeration and allowing fermentation to ensue, and subjecting the mixture to intensive aeration whereby to favor production of acetyl-methyl-carbinol.

15. In the manufacture of useful products by fermentation with the aid of bacteria capable of producing butylene-glycol under normal conditions of aeration, the process which comprises mashing a starchy vegetable product, adding phosphatic material to the mash, subjecting the mixture to fermentation with the aid of bacteria capable of producing butylene-glycol in such a mixture under normal conditions of aeration and intensively aerating the mixture to favor production of acetyl-methyl-carbinol.

16. The process according to claim 15, in which the mash is saccharified prior to fermentation.

17. The process according to claim 15, in which a carbonate is also added to the mash.

18. In the manufacture of useful products by fermentation with the aid of bacteria capable of producing butylene-glycol under normal conditions of aeration, the process which comprises preparing a saccharified potato mash, adding thereto phosphatic material, fermenting the mash with the aid of a culture of bacteria capable of producing butylene-glycol in such a mash under normal conditions of aeration, and intensively aerating the mash to favor production of acetyl-methyl-carbinol.

19. In the manufacture of useful products by fermentation with the aid of bacteria capable of producing butylene-glycol under normal conditions of aeration, the process which comprises fermenting an industrial sugar-containing material, such as a molasses, with a bacterial culture capable of producing butylene-glycol in such a medium under normal conditions of aeration, said medium containing supplemental nutrient material added thereto, and intensively aerating the mixture to favor production of acetyl-methyl-carbinol.

20. In the manufacture of useful products by fermentation with the aid of bacteria capable of producing butylene-glycol under normal conditions of aeration, the process which comprises fermenting a suitable fermentable carbohydrate mash by means of bacteria capable of producing butylene-glycol in such a mash under normal conditions of aeration, subjecting the mash during fermentation to aeration at a rate substantially in excess of 2.4 cubic meters of air per hour per hectolitre of mash, and separating resultant acetyl-methyl-carbinol.

21. The process according to claim 20, in which the rate of aeration is increased as the fermentation progresses.

In testimony whereof we hereunto affix our signatures.

ALBERT JAN KLUYVER.
MARINUS ADRIANUS SCHEFFER.